May 22, 1934.  D. J. FOGELSON  1,959,911
FISH LURE
Filed April 10, 1933

INVENTOR:
David J. Fogelson
BY David E. Carlsen
ATTORNEY.

Patented May 22, 1934

1,959,911

UNITED STATES PATENT OFFICE 1,959,911

FISH LURE

David J. Fogelson, West St. Paul, Minn.

Application April 10, 1933, Serial No. 665,362

3 Claims. (Cl. 43—35)

This invention relates to artificial baits, or fish lures, and is designed particularly for so-called surface plugs for casting purposes. The device is absolutely weed-proof being adapted to be cast in shallow water among lily pads and weeds where it is accessible to fish normally obtainable only in shallow waters and where hitherto the presence of weeds etc. has been a source of considerable trouble in bait casting.

The object of this invention is to provide a plug of a type comprising an elongated buoyant body in which are mounted a number of normally retracted hooks, one or more of said hooks being projected out of the plug radially when a fish "strikes" the bait. Said projection of the hooks is accomplished by the unique construction hereinafter fully set forth reference being had to the accompanying drawing, in which,—

Figure 1:
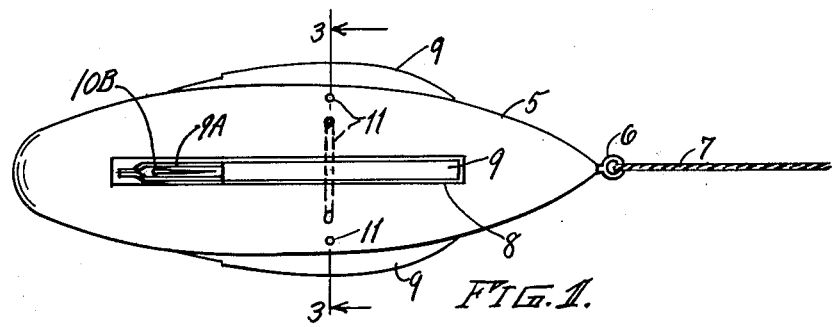
Fig. 1 is a plan view of my improved surface plug in the condition in which it is drawn through the water or on the surface thereof.

Referring to the drawing by reference numerals, 5 is the body of the lure comprising an elongated buoyant member preferably of about the shape illustrated namely tapered toward the front end and tapered to a rounded rear end. The material is preferably wood but the body may also be of light sheet metal and formed to constitute a hollow buoyant plug. In either case it is designed so that it floats on or near the water surface, suitable weight means well known to anglers being used if it is desired to have the device sink below the surface. 6 is an eye at the front end of the plug for attaching the usual casting line 7.

Figure 2:
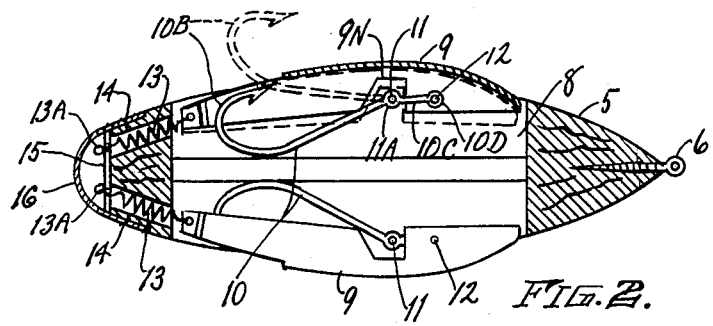
Fig. 2 is a longitudinal sectional view of the plug disclosing mainly two retracted fish hooks and additionally a sprung fish hook (the upper one) in dotted lines and positioned to catch a fish.
Figure 3:
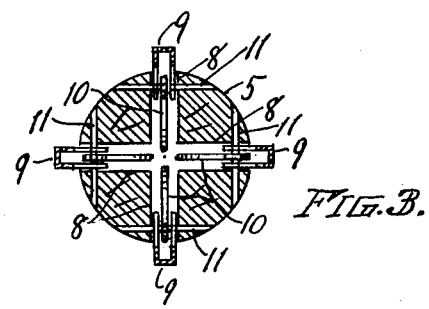
Fig. 3 is a transverse sectional view of the plug as on line 3—3 in Fig. 1.

The plug has longitudinal radial slots 8, each slot extending the major part of the length of the plug and terminating in spaced relation to each end thereof. In Figs. 1, 2 and 3, four slots are shown and in Fig. 4 only three are shown.

Figure 4:
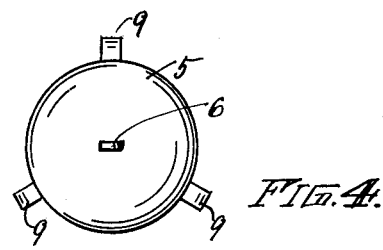
Fig. 4 is a front end, or right hand end elevation, of Fig. 1 showing a modification.

In each slot I mount a radially reciprocable metal member 9 arched longitudinally and of inverted U shape in cross section as distinctly shown in Fig. 3. These members will hereinafter be designated as contact cams, the end parts of all said cams being always inwardly of the exterior surface or face of the plug, but the arched or outwardly curved part of each of said cams protruding outwardly of the plug surface (as best shown in Figs. 1 and 4.)

At the rear part of each cam, it is open as at 9A for a predetermined distance sufficient for the barb end 10B of a fish hook 10 to be projected, freely and outwardly through said opening. Normally the fish hooks are retracted, within the body of the plug, as shown in full lines in Fig. 2, at which time the cams 9 are in their outermost positions (as in Figs. 1 and 2). The shank of each fish-hook is pivotally mounted at 11A on a fixed pin 11 extending across slot 8, the side walls of the cam being formed with an inwardly opening notched portion 9N straddling pin 11 freely. Forward of the fish-hook fulcrum 11A it is formed with a forwardly directed extension arm 10C terminating in an eye 10D pivotally engaging a transverse pin 12 (Fig. 2) traversing the opening of the cam between its two walls. It will now be readily understood that with the plug "set" for casting purposes (its hooks all retracted) and the cams in their outward positions, when the plug is drawn through or along the surface of the water the hooks remain unexposed and the plug slides freely through weeds or other ordinary obstacles. However when a fish strikes the lure and bites on the plug, one or more of the cams are pressed inwardly. This action causes the transverse pin 12 to move inwardly swinging the arm 10C of the hook on the pin 11 and the main shank of the fish hook and its barbed end are instantly forced outwardly, the hook end 10B being exposed and in position to catch the fish. The said hook or hooks 10B remain thus exposed until the device is reset.

I provide certain tension means for each cam, bearing rearwardly on the entire cam, to hold it inward when the hook has been projected as described. These tension means comprise preferably for each cam a tension coil spring 13 suitably and slidably located in the rear part of the plug, as in a bore 14 in said part of the plug, each spring being suitably connected, under tension, with its forward end attached to the rear terminus of a cam 9, (Fig. 2).

The tension means 13 may possibly be simplified or other equivalent means used.

In Fig. 2 the rear ends of the springs 13 are merely projected through an apertured plate 15 and drawn through far enough for desired tension then bent as at 13A to retain the spring in said tension. These exposed ends and plate 15 may then be covered by a suitable removable cap member 16, to provide an unbroken curvature or contour of the plug.

It will be readily understood that each cam 9 is retained on pin 12 on which the forward extremity of a fish-hook is pivotally connected and it is preferred that when the cam is in its "set" or outermost position the arm 10C of its hook is about horizontal or in a plane parallel to the longitudinal axis of the plug or slightly inclined upward to 12. Inward pressure on the cam causes arm 10C to swing downward and its front end on a rearward arc with reference to its fulcrum 11. Therefore the tension spring not only causes the entire cam to remain tensed rearwardly but simultaneously causes the fish hook rearward of fulcrum 11 to be sprung outward as to dotted line position in Fig. 2. To reset the device the exposed barbed hook is merely pressed inward, the tension action of spring 13 holding the cam in either of its two positions.

I claim:

1. In a fish lure of the class described including an elongated buoyant body with fish line attaching means at one end; said body tapered to both ends and comprising a plug formed with a number of longitudinal slots each extending radially from the center part of the plug, a projectible fish hook member for each slot and normally concealed within the slot, an elongated, arched cam member mounted outwardly of the hook with its outer parts exposed exteriorly of the slot, pivotal connection for said cam member and the forward extremity of the hook, a fulcrum pin for the shank of the fish hook and rearward of said pivotal connection and tension means connected to said cam member and to one end of the plug.

2. An artificial weedless casting bait comprising an elongated buoyant body of approximately round form in cross section and formed with elongated, radial slots intermediate its ends, a fish-hook pivotally mounted in each slot, a cam member pivoted on the body and normally closing the major part of each slot and projecting therefrom, said fish-hook being mounted with its barbed end rearward and means pivotally connecting the forward end of the fish-hook shank to said cam member, said cam member being oscillatable in the plane of the slot to swing the fish hook on its pivot to expose the barb or conceal the barbed end alternately.

3. The structure specified in claim 2 and a tension coil spring for each cam member and connected under tension to the rear end part thereof, said fish-hook shank comprising a short lever arm integral and forward of the fish-hook pivot and said tension means being arranged to urge the cam member rearwardly with continuous tension and acting on said arm to impel the fish-hook inwardly and outwardly by corresponding outward or inward action of said arm.

DAVID J. FOGELSON.